United States Patent
Elbanhawy (10) Patent No.: US 6,449,174 B1
(45) Date of Patent: Sep. 10, 2002

(54) CURRENT SHARING IN A MULTI-PHASE POWER SUPPLY BY PHASE TEMPERATURE CONTROL

(75) Inventor: Alan Elbanhawy, Hollister, CA (US)

(73) Assignee: Fairchild Semiconductor Corporation, South Portland, ME (US)

(*) Notice: Subject to any disclaimer, the term of this patent is extended or adjusted under 35 U.S.C. 154(b) by 0 days.

(21) Appl. No.: 09/923,861

(22) Filed: Aug. 6, 2001

(51) Int. Cl.[7] .................................................. H02M 1/00
(52) U.S. Cl. .......................................... 363/65; 323/907
(58) Field of Search ...................... 363/15, 65; 323/282, 323/907

(56) References Cited

U.S. PATENT DOCUMENTS

| | | | |
|---|---|---|---|
| 3,999,370 A | * | 12/1976 | Morokawa et al. |
| 4,467,616 A | * | 8/1984 | Kitauchi |
| 5,460,050 A | * | 10/1995 | Miyano |
| 5,469,042 A | * | 11/1995 | Ruhling |
| 5,668,506 A | * | 9/1997 | Watanabe et al. |
| 5,723,974 A | * | 3/1998 | Gray |

\* cited by examiner

*Primary Examiner*—Adolf Deneke Berhane
(74) *Attorney, Agent, or Firm*—Townsend and Townsend and Crew LLP (57) ABSTRACT

An apparatus for and method of achieving current balancing among phases of a multi-phase power supply by reducing and controlling the temperature variation among packages disposed within each phase. Each package contains a dc-to-dc converter (e.g. a buck converter), a temperature sensor and may also contain a driver, which supplies a pulse train for driving the converter. By controlling the temperature among phases to within $\pm X$ % a balancing of currents among phases to within $\pm X/2$ % is achieved.

30 Claims, 4 Drawing Sheets

CURRENT SHARING IN A MULTI-PHASE POWER SUPPLY BY PHASE TEMPERATURE CONTROL

BACKGROUND OF THE INVENTION

The present invention relates in general to power supplies. More specifically, the present invention relates to current sharing in multiphase switching power supplies.

As microprocessors and their supporting components become larger and more complex, the load presented by these devices becomes heavier. As a consequence, the power supply, which powers the microprocessor and its supporting components, must be capable of providing higher currents.

One way of increasing the current capability of a power supply is to use two or more phases or multi-phase switching mode converters to drive the load. Typically, these multi-phase supplies are designed with phase interleaving in order to reduce ripple in the converted signal.

A recognized problem associated with multi-phase power supplies relates to an uneven distribution of load currents carried among the various phases of the supply. If this uneven distribution is substantial, a single phase may be burdened with supplying most of the load current. This problem not only limits the output capability of the supply, it also affects its reliability. Accordingly, methods of equalizing the distribution of load current among phases have been sought and developed. These methods have often been referred to in the art as "current sharing" methods.

One "current sharing" approach measures the voltage dropped across precision power resistors placed in the load current path of each of the power supply phases. This approach is undesirable for at least two reasons. First, use of precision power resistors is costly, especially as current demands continue to rise, since the resistors must be made physically larger. Second, because precision power resistors dissipate wasted power, the efficiency of the power supply is compromised.

To avoid reliance on highly dissipative and costly precision resistors, an alternative current sharing approach measures the voltage drop across switching elements in one or more phases of the supply. Because these voltage drops are proportional to the currents supplied by the corresponding power phases, they can be used to direct current sharing among power stages. Whereas this approach may be an improvement, in that it does not require use of precision power resistors, a problem is that it is not a very accurate method. For example, individual phase currents, derived from the measured voltages, can produce inaccuracies of up to 60%.

Accordingly, there exists a need for a simple, inexpensive and accurate current sharing method, which can be used in multi-phase power supplies.

BRIEF SUMMARY OF THE INVENTION

According to a first aspect of the invention, a current sharing multi-phase power supply comprises a first phase unit, having a first package containing a first dc-to-dc converter. The dc-to-dc converter of the first phase unit supplies a first portion of a load current to a load. The first phase unit further includes a first pulse width modulator coupled to the first converter. This first pulse width modulator functions to provide a first periodic pulse train to the first converter. The multi-phase supply also has at least a second phase unit, which includes a second dc-to-dc converter and a second pulse width modulator coupled to the second converter. The second pulse width modulator functions to provide a second periodic pulse train to the second converter and the second dc-to-dc converter supplies a second and remaining portion of the load current to the load. The supply further comprises a temperature control bus, which is coupled to the first and second phase units. The temperature control bus has a bus temperature related to temperatures of the first and second packages. Duty cycles of the first and second pulse trains are adjusted in a feedback operation, the extent of the adjustments depending on a relationship among the temperatures of the first and second packages and the bus temperature. Depending on the application, the bus voltage on the temperature control bus represents either an average or a peak of the measured temperatures of the first and second packages.

In a second aspect of the invention, a multi-phase power supply having a plurality of phase blocks is disclosed. Each phase block comprises a package containing a dc-to-dc converter, a temperature sensor and a temperature-to-voltage converter. Each phase block also includes a pulse width modulator disposed within a feedback loop and coupled between an output of the temperature-to-voltage converter and an input of the converter.

In a third aspect of the invention, a method of promoting current sharing among phases of a multi-phase power supply comprises the steps of, measuring a temperature of a package containing a dc-to-dc converter for each phase and, for each phase, employing a feedback control means, disposed between an output of the supply and a control input of the converter, to control and reduce the temperature variation and current variation among packages.

A further understanding of the nature and the advantages of the inventions disclosed herein may be realized by reference to the remaining portions of the specification and the attached drawings.

DETAILED DESCRIPTION OF THE INVENTION

Figure 1:
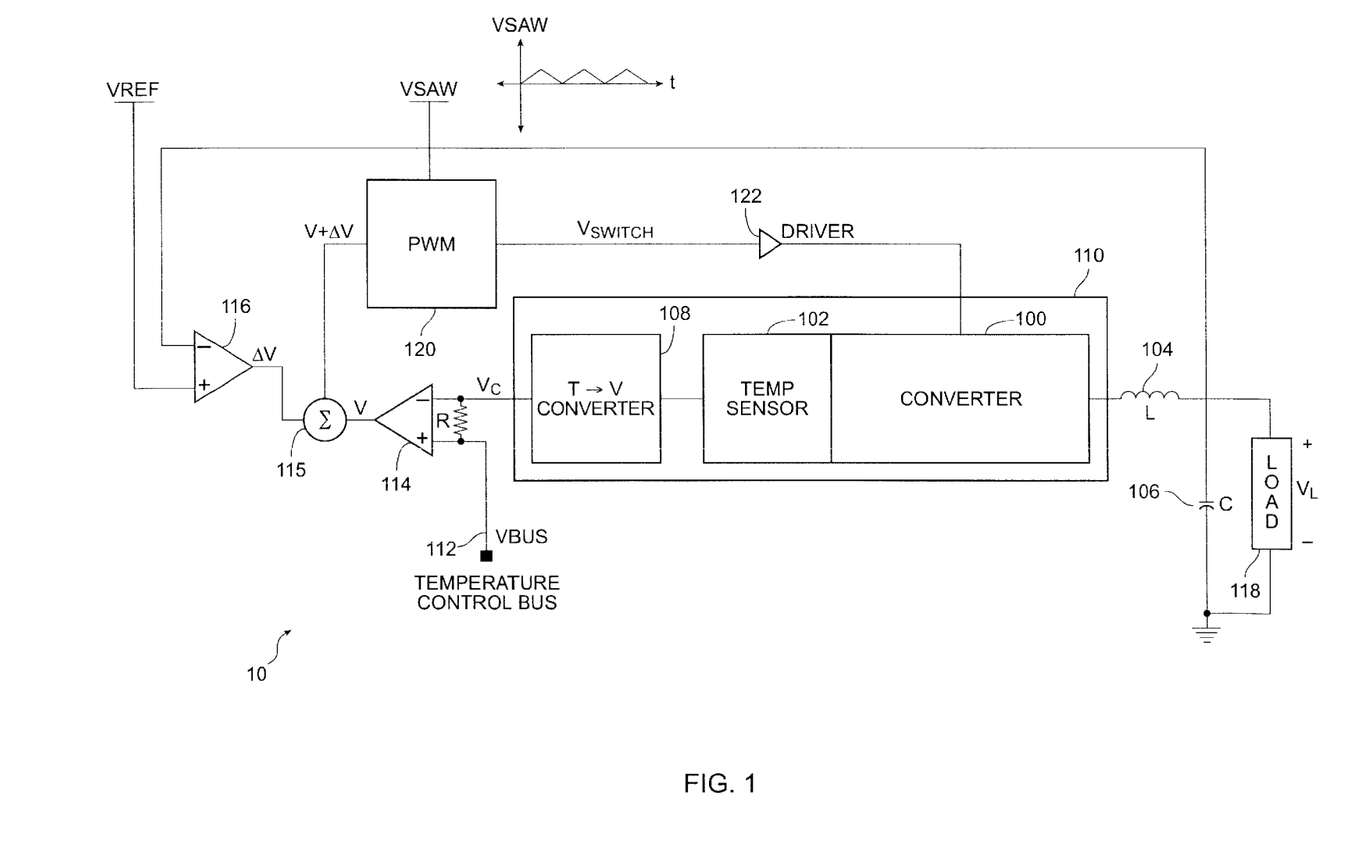
FIG. 1 shows an exemplary single-phase power supply, which houses a converter and a temperature sensor within a single package, according to an embodiment of the present invention.

Referring first to FIG. 1, there is shown an exemplary single-phase power supply 10, which houses a converter 100 and a temperature sensor 102 within a single package 110, according to an embodiment of the present invention. Converter 100 may comprise a buck converter having one or more switching elements, which may be, for example, metal-oxide-semiconductor field effect transistors (MOSFETs), bipolar junction transistors (BJTs), silicon controlled rectifiers (SCRs), or the like. If a buck converter, inductor 104 and capacitor 106 actually comprise part of the converter and function as current and voltage filters for reducing ripple in the current and voltage signals at the output of converter 100.

In the single-phase embodiment shown in FIG. 1, converter 100, temperature sensor 102 and a temperature-to-voltage converter 108 are contained in a single, tightly-coupled package 110. Temperature sensor 102 is coupled to package 110, preferably in close proximity to a switching element of converter 100, to measure and determine the temperature of the converter 100. The measured temperature is converted to a voltage, $V_C$, by temperature-to-voltage converter 108, which may or may not be included within package 110. Temperature-to-voltage converter 108 may comprise, for example, a diode having a temperature dependent voltage, or a commercially available monolithic integrated circuit, which integrates both the temperature sensor 102 and temperature-to-voltage converter 108 in a single package.

Once the temperature of converter 100 is determined by temperature sensor 102, the difference between a temperature-dependent voltage, $V_{BUS}$, on a temperature control bus 112 and $V_C$ are input into an operational amplifier (op-amp) 114. The output of op-amp 114 is represented by a voltage, V, which has a positive value if $(V_{BUS}-V_C)>0$ and a negative value if $(V_{BUS}-V_C)<0$. Similarly, the output voltage increment, $\Delta V$, of the error amplifier 116 in FIG. 1 has a positive value, if an input reference voltage, $V_{REF}$, is greater than the voltage drop, $V_L$, across the load 118 and has a negative value if $V_{REF}<V_L$.

As shown in FIG. 1, V and $\Delta V$ are summed by a summer 115 and then input into pulse width modulator (PWM) 120. Another input to PWM 120 is a periodic sawtooth waveform, $V_{SAW}$. From (V+$\Delta V$) and $V_{SAW}$, PWM 120 generates a periodic, on-off switching signal, $V_{SWITCH}$, which controls the switching elements of converter 100, via a driver 122. It should be noted that, while driver 122 in the embodiment shown in FIG. 1 is located outside package 110, in an alternative embodiment, driver 122 may be packaged within package 110.

The duty cycle of $V_{SWITCH}$ is dependent upon and modified by the magnitude of the sum of (V+$\Delta V$). If $(V_{BUS}-V_C)>0$ and $(V_{REF}-V_L)>0$, then (V+$\Delta V$) is positive and PWM 120 operates to increase the duty cycle of $V_{SWITCH}$. The increase in duty cycle causes the average load voltage to increase and, consequently, the temperature of converter 100 rises in response. On the other hand, if $(V_{BUS}-V_C)<0$ and $(V_{REF}-V_L)<0$, then (V+$\Delta V$) is negative and the PWM 120 operates to decrease the duty cycle of $V_{SWITCH}$. The decrease in duty cycle causes the average load voltage to decrease and, consequently, the temperature of converter 100 drops. In either case, the feedback operation continues, until the temperature of converter 100 and, consequently, package 110 becomes approximately equal to the temperature of temperature control bus 112.

Figure 2:
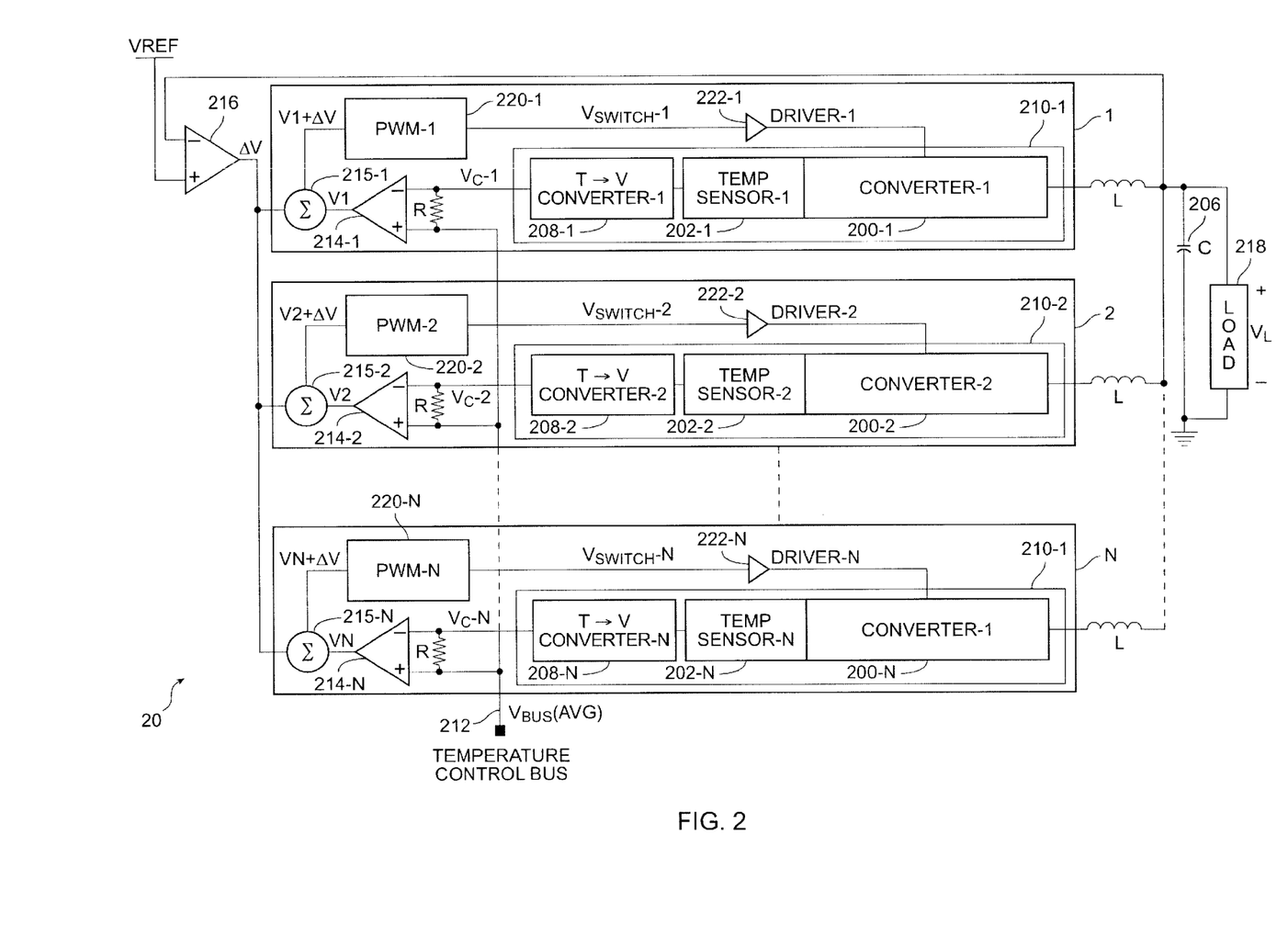
FIG. 2 shows an exemplary multi-phase power supply, which employs an average temperature control function to achieve current sharing among phases of the supply, according to an embodiment of the present invention.

Referring now to FIG. 2, there is shown an exemplary multi-phase power supply 20, which employs an average temperature control function to achieve current sharing among phases of the supply, according to an embodiment of the present invention. Multi-phase power supply 20 comprises N phases, where N is an integer, which is greater than or equal to one, and represents the maximum number of phases in the supply. If N=1, multi-phase power supply 20 reduces to the single-phase power supply 10 shown in FIG. 1. However, if N>1, then each phase of multi-phase power supply 20 shares a single error amplifier 216 and is coupled to a single temperature control bus 212, as shown in FIG. 2.

Like the single-phase embodiment shown in FIG. 1, the phases of the multi-phase power supply shown in FIG. 2 contain single, tightly-coupled packages 210-1 through 210-N. Packages 210-1 through 210-N comprise converters 200-1 through 200-N, temperature sensors 202-1 through 202-N and temperature-to-voltage converters 208-1 through 208-N, respectively. Temperature sensors 202-1 through 202-N are coupled to their respective packages 210-1 through 210-N, preferably in close proximity to one or more switching element to measure the temperatures of their corresponding packages 210-1 through 210-N. The measured temperatures are converted to voltages $V_{C-1}$ through $V_{C-N}$ by temperature-to-voltage converters 208-1 through 208-N. Although temperature-to-voltage converters 208-1 through 208-N are shown as being included within packages 210-1 through 210-N, in an alternative embodiment they are located outside packages 210-1 through 210-N.

The converted voltages $V_{C-1}$ through $V_{C-N}$ of phases 1 through N are coupled to the inverting inputs of op-amps 214-1 through 214-N, respectively. A common temperature control bus 212 is coupled to the non-inverting inputs of the op-amps 214-1 through 214-N. Each of op-amps 214-1 through 214-N also has a resistor R coupled across its inputs. These resistors preferably have the same resistance and have voltage drops across them of $(V_{BUS}-V_{C-1})$, $(V_{BUS}-V_{C-2})$ ... $(V_{BUS}-V_{C-N})$. Using a Thévenin or Norton transformation of these voltage drops across the resistors R (or by applying some other appropriate circuit analysis), it can be shown that $V_{BUS}$ represents the average of the converted voltages $V_{C-1}$ through $V_{C-N}$, or, in other words, $V_{BUS}(avg)=(V_{C-1}+V_{C-2}+\ldots V_{C-N})/N$. Accordingly, since the converted voltages $V_{C-1}$ through $V_{C-N}$ represent the temperatures of phases 1 through N, the temperature on temperature control bus 212, as represented by $V_{BUS}(avg)$, is an average of the temperatures of packages 210-1 through 210-N.

The outputs of op-amps 214-1 through 214-N are labeled as voltages V1 through VN, respectively. The polarity of each of voltages V1 through VN is determined by whether the converted voltages $V_{C-1}$ through $V_{C-N}$ are greater than or less than $V_{BUS}(avg)$. Each of V1 through VN are individually summed with the output voltage increment, $\Delta V$, of common error amplifier 216, by summers 215-1 through 215-N, to provide input signals V1+$\Delta V$ through VN+$\Delta V$, which are coupled to a pulse width correction input of PWMs 220-1 through 220-N, respectively. Each of PWMs 220-1 through 220-N has a second input for a sawtooth signal, similar to what was described for the single-phase supply. (To enhance clarity, these sawtooth inputs and signals are not shown in FIG. 2.) Preferably, the sawtooth signals among phase 1 through N are interleaved, i.e., have predetermined phase differences among the phases. Interleaving reduces ripple on the output signal, $V_L$, dropped across load 218 and also allows for a smaller filter capacitor 206 to be used.

PWMs 220-1 through 220-N generate periodic, on-off switching signals, $V_{SWITCH-1}$ through $V_{SWITCH-N}$. These switching signals $V_{SWITCH-1}$ through $V_{SWITCH-N}$ control the switching elements of converters 200-1 through 200-N, via drivers 222-1 through 222-N, respectively. It should be noted that, while drivers 222-1 through 222-N are shown as being located outside packages 210-1 through 210-N, in an alternative embodiment, drivers 222-1 through 222-N are located within packages 210-1 through 210-N, respectively.

The duty cycles of on-off switching signals $V_{SWITCH-1}$ through $V_{SWITCH-N}$ depend upon the magnitudes of the sums of (V1+$\Delta V$) through (VN+$\Delta V$). For example, focusing on phase 1 of supply 20, if $(V_{BUS}(avg)-V_{C-1})>0$ and $(V_{REF}-$ $V_L$)>0, then (V1+ΔV) is positive and PWM 220-1 operates to increase the duty cycle of $V_{SWITCH-1}$. The increase in duty cycle of $V_{SWITCH-1}$ causes the portion of the load current supplied by converter 200-1 to increase and, consequently, the temperature of converter 200-1 rises in response. On the other hand, if ($V_{BUS}$(avg)−$V_{C-1}$)<0 and ($V_{REF}$−$V_L$)<0, then (V1+ΔV) is negative and PWM 220-1 operates to decrease the duty cycle of $V_{SWITCH-1}$. The decrease in duty cycle of $V_{SWITCH-1}$ causes the portion of the load current supplied by converter 200-1 to decrease and, consequently, the temperature of converter 200-1 drops in response. In either case, the feedback operation continues, until the temperature of converter 200-1 and, consequently, package 210-1 becomes approximately equal to the average temperature on temperature control bus 212. The feedback operation for the remaining phases of supply 20 is similar to that of phase 1. Accordingly, the feedback operation causes all phases 1 through N to converge to the average temperature on temperature control bus 212.

Each of packages 210-1 through 210-N are, preferably, tightly-coupled and include a substantially similar heat sink. Under these conditions, the temperature rise ΔT of each package is equal to the product of the power dissipated by the heat-sinked package (i.e. $P_{diss}$) and the thermal resistance of the heat sink, $R_\Theta$. Accordingly, since $P_{diss}$ is proportional to $I^2$, ΔT is also proportional to $I^2$. From these relationships, it is seen that the variation in current from phase to phase of supply 20 can be balanced by the temperature control operation described above. In fact, it can be shown that by controlling the temperature among phases within a range of ±X %, a current balance of ±X/2% among phases is achieved.

Figure 3:
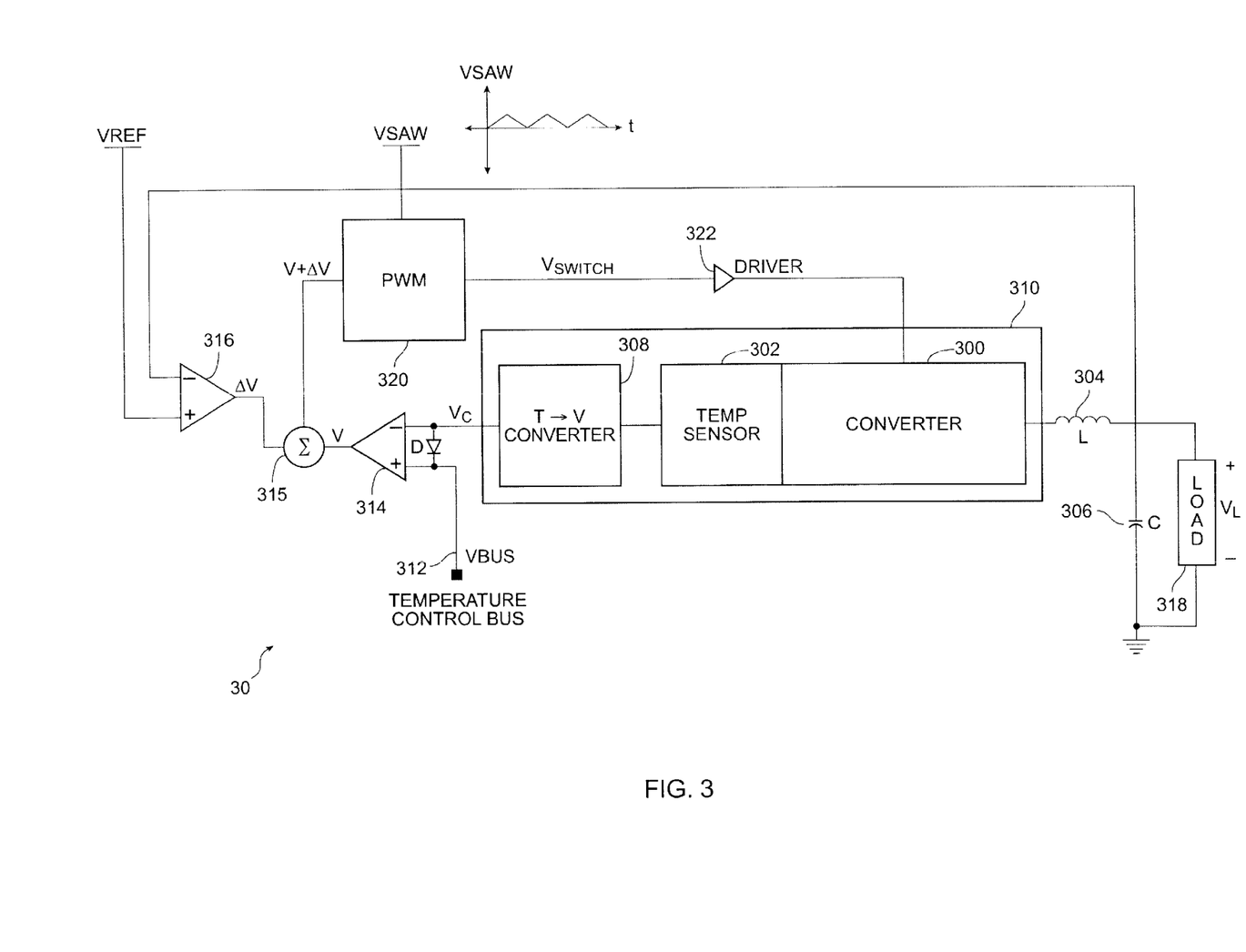
FIG. 3 shows an alternative, exemplary single-phase power supply, which houses a converter and a temperature sensor within a single package, according to an embodiment of the present invention.

Referring now to FIG. 3, there is shown an alternative, exemplary single-phase power supply 30, which houses a converter 300 and a temperature sensor 302 within a single package 310, according to another embodiment of the present invention. The primary physical difference between the embodiments shown in FIGS. 1 and 3 relates to the component coupled between the inputs of the op-amp coupled to the temperature-to-voltage converter. Whereas the component in FIG. 1 is a resistor, the component in FIG. 3 is a diode (labeled "D") having an anode coupled to the inverting input and a cathode coupled to the non-inverting input of op-amp 314. As explained below, the single-phase supply 30 can be used in a multi-phase power supply to control the temperature among phases of the multi-phase supply to achieve current balancing among phases.

Converter 300 of the single-phase power supply 30 may comprise a buck converter having one or more switching elements, which may be, for example, metal-oxide-semiconductor field effect transistors (MOSFETs), bipolar junction transistors (BJTs), silicon controlled rectifiers (SCRs), or the like. If a buck converter, inductor 304 and capacitor 306 actually comprise part of the converter and function as current and voltage filters for reducing ripple in the current and voltage signals at the output of converter 300.

In the single-phase embodiment shown in FIG. 3, converter 300, temperature sensor 302 and a temperature-to-voltage converter 308 are contained in a single, tightly-coupled package 310. Temperature sensor 302 is coupled to package 310, preferably in close proximity to a switching element of converter 300, to measure and determine the temperature of the converter 300. The measured temperature is converted to a voltage, $V_C$, by temperature-to-voltage converter 308, which may or may not be included within package 310. Temperature-to-voltage converter 308 may comprise, for example, a diode having a temperature dependent voltage, or a commercially available monolithic integrated circuit, which integrates both the temperature sensor 302 and temperature-to-voltage converter 308 in a single package.

Once the temperature of converter 300 is determined by temperature sensor 302, the difference between a temperature-dependent voltage, $V_{BUS}$, on a temperature control bus 312 and $V_C$ are input into an operational amplifier (op-amp) 314. The output of op-amp 314 is represented by a voltage, V, which is substantially equal to zero, if $V_C = V_{BUS}$, and is positive if $V_C < V_{BUS}$. The output voltage increment, ΔV, of the error amplifier 316 has a positive value, if an input reference voltage, $V_{REF}$, is greater than the voltage drop, $V_L$, across the load 318 and has a negative value if $V_{REF} < V_L$.

As shown in FIG. 3, V and ΔV are summed by a summer 315 and then input into pulse width modulator (PWM) 320. Another input to PWM 320 is a periodic sawtooth waveform, $V_{SAW}$. From (V+ΔV) and $V_{SAW}$, PWM 320 generates a periodic, on-off switching signal, $V_{SWITCH}$, which controls the switching elements of converter 300, via a driver 322. It should be noted that, while driver 322 in the embodiment shown in FIG. 3 is located outside package 310, in an alternative embodiment, driver 322 may be packaged within package 310.

The duty cycle of $V_{SWITCH}$ is dependent upon and modified by the magnitude of the sum of (V+ΔV). If $V_{BUS} > V_C$ and $V_{REF} > V_L$, then (V+ΔV) is positive and PWM 320 operates to increase the duty cycle of $V_{SWITCH}$. The increase in duty cycle causes the average load voltage to increase and, consequently, the temperature of converter 300 rises in response. The feedback operation continues, until the temperature of converter 300 and, consequently, package 310 becomes equal to the temperature on temperature control bus 312, after which the feedback operation stops until $V_{BUS}$ once again becomes larger than $V_C$.

Figure 4:
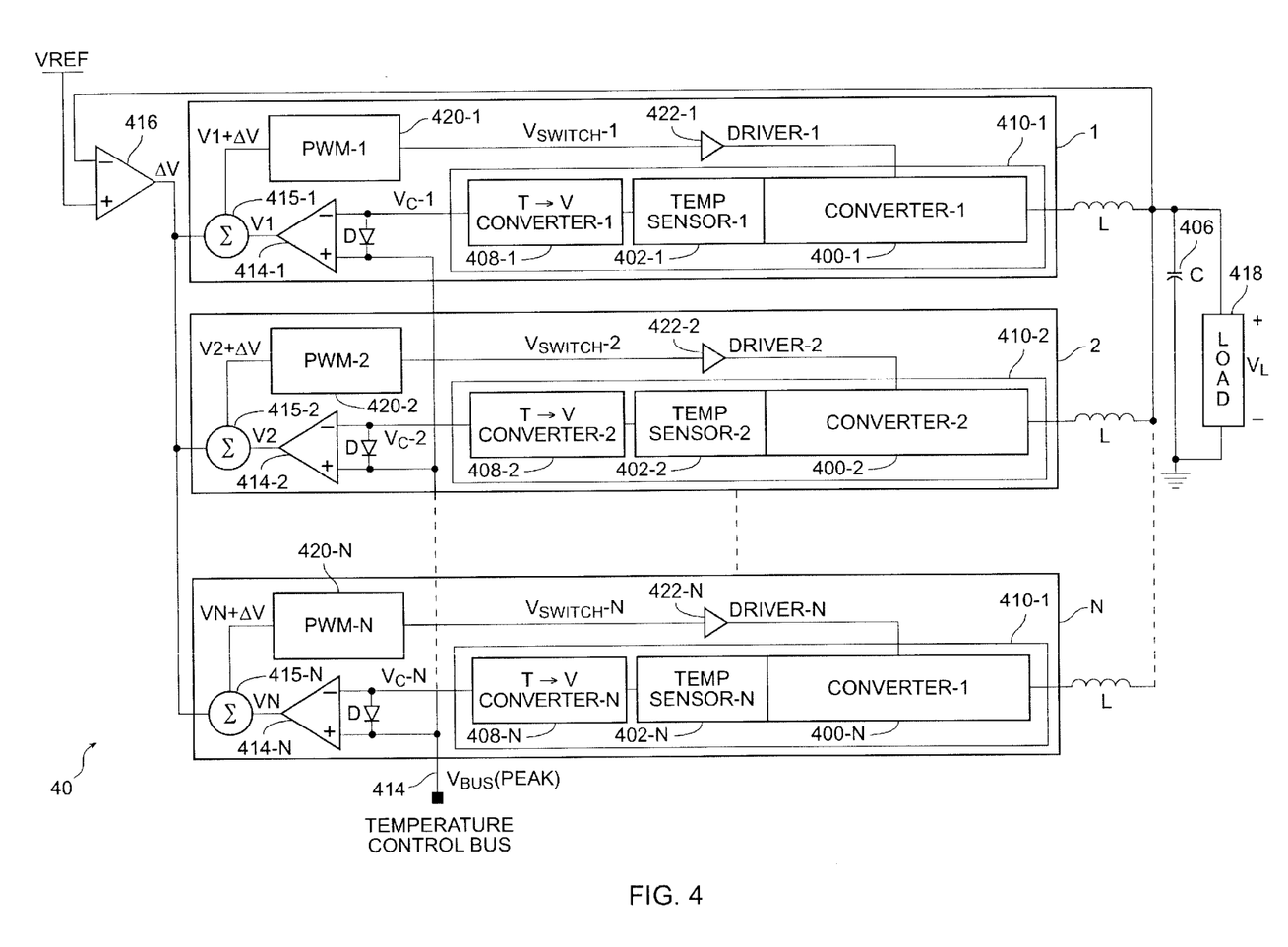
FIG. 4 shows an exemplary multi-phase power supply, which employs a peak temperature control function to achieve current sharing among phases of the supply, according to an embodiment of the present invention.

Referring now to FIG. 4, there is shown an exemplary multi-phase power supply 40, which employs a peak temperature control function to achieve current sharing among phases of the supply, according to an embodiment of the present invention. Multi-phase power supply 40 comprises N phases, where N is an integer, which is greater than or equal to one, and represents the maximum number of phases in the supply. If N=1, multi-phase power supply 40 reduces to the single-phase power supply 30 shown in FIG. 3. However, if N>1, then each phase of multi-phase power supply 40 shares a single error amplifier 416 and is coupled to a single temperature control bus 412, as shown in FIG. 4.

Like the single-phase embodiment shown in FIG. 3, the phases of the multi-phase power supply shown in FIG. 4 contain single, tightly-coupled packages 410-1 through 410-N. Packages 410-1 through 410-N comprise converters 400-1 through 400-N, temperature sensors 402-1 through 402-N and temperature-to-voltage converters 408-1 through 408-N, respectively. Temperature sensors 402-1 through 402-N are coupled to their respective packages 410-1 through 410-N, preferably in close proximity to one or more switching elements to measure the temperatures of their corresponding packages 410-1 through 410-N. The measured temperatures are converted to voltages $V_{C-1}$ through $V_{C-N}$ by temperature-to-voltage converters 408-1 through 408-N. Although temperature-to-voltage converters 408-1 through 408-N are shown as being included within packages 410-1 through 410-N, in an alternative embodiment they are located outside packages 410-1 through 410-N.

The converted voltages $V_{C-1}$ through $V_{C-N}$ of phases 1 through N are coupled to the inverting inputs of op-amps 414-1 through 414-N, respectively. A common temperature control bus 412 is coupled to the non-inverting inputs of the op-amps 414-1 through 414-N. Each of op-amps 414-1 through 414-N also has a diode (labeled "D") coupled across its inputs, the anode coupled to the inverting input and the cathode coupled to the non-inverting input. In this embodiment, the temperature on temperature control bus 412 is represented by $V_{BUS}$(peak), which represents the highest temperature of the converted voltages $V_{C-1}$ through $V_{C-N}$. The diodes, $V_{BUS}$(peak), and the feed back operation within phases 1 through N together ensure that the temperature of any of the packages 410-1 through 410-N does not exceed the temperature on temperature control bus 412, which is characterized by $V_{BUS}$(peak).

The outputs of op-amps 414-1 through 414-N are labeled as voltages V1 through VN, respectively. Any of V1 through VN are nonzero if the corresponding converted voltages $V_{C-1}$ through $V_{C-N}$ are less than $V_{BUS}$(peak). Here it is assumed that the diodes are ideal. Accordingly, a diode presents itself as a short circuit if a particular $V_C$ is greater than $V_{BUS}$(peak) and presents itself as an open circuit if $V_C$ is less than $V_{BUS}$(peak). Whereas it has been assumed and it is preferred that the diodes in this embodiment are ideal, it is to be understood that they need not necessarily be.

Each of V1 through VN are individually summed with the output voltage increment, $\Delta V$, of common error amplifier 416, by summers 415-1 through 415-N, to provide input signals V1+$\Delta V$ through VN+$\Delta V$. V1+$\Delta V$ through VN+$\Delta V$ are coupled to a pulse width correction input of PWMs 420-1 through 420-N, respectively. Each of PWMs 420-1 through 420-N has a second input for a sawtooth signal, similar to what was described for the single-phase supply shown in FIG. 3. (To enhance clarity, these sawtooth signals are not shown in FIG. 4.) Preferably, the sawtooth signals among phase 1 through N are interleaved, i.e., have predetermined phase differences among the phases. Interleaving reduces ripple on the output signal, $V_L$, dropped across load 418 and also allows for a smaller filter capacitor 406 to be used.

PWMs 420-1 through 420-N generate periodic, on-off switching signals, $V_{SWITCH-1}$ through $V_{SWITCH-N}$. These switching signals $V_{SWITCH-1}$ through $V_{SWITCH-N}$ control the switching elements of converters 400-1 through 400-N, via drivers 422-1 through 422-N, respectively. It should be noted that, while drivers 422-1 through 422-N are shown as being located outside packages 410-1 through 410-N, in an alternative embodiment, drivers 422-1 through 422-N are located within packages 410-1 through 410-N, respectively.

The duty cycles of on-off switching signals $V_{SWITCH-1}$ through $V_{SWITCH-N}$ depend upon the magnitudes of the sums of (V1+$\Delta V$) through (VN+$\Delta V$). For example, focusing on phase 1 of supply 40, if ($V_{BUS}$(peak)$-V_{C-1}$)>0 and ($V_{REF}-V_L$)>0, then (V1+$\Delta V$) is positive and PWM 420-1 operates to increase the duty cycle of $V_{SWITCH-1}$. The increase in duty cycle of $V_{SWITCH-1}$ causes the portion of the load current supplied by converter 400-1 to increase and, consequently, the temperature of converter 400-1 rises in response. On the other hand, if ($V_{BUS}$(peak)$-V_{C-1}$)<0, V1 is equal to zero and, depending on the sign of $\Delta V$, PWM 420-1 operates to either increase or decrease the duty cycle of $V_{SWITCH-1}$. Under these conditions, the feedback operation continues ensuring that the temperature of converter 400-1 and, consequently, package 410-1 remain less than the peak temperature on temperature control bus 412, which is characterized by $V_{BUS}$(peak). The feedback operation for the remaining phases of supply 40 is similar to that of phase 1. Accordingly, the feedback operation causes the temperatures on all phases 1 through N to remain below the peak temperature on temperature control bus 412.

Each of packages 410-1 through 410-N are, preferably, tightly-coupled and include a substantially similar heat sink. Under these conditions, the temperature T of each package is equal to the product of the power dissipated by the heat-sinked package (i.e. $P_{diss}$) and the thermal resistance of the heat sink, $R_\theta$. Accordingly, since $P_{diss}$ is proportional to $I^2$, T is also proportional to $I^2$. From these relationships, it is seen that the variation in current from phase to phase of supply 20 can be balanced by the temperature control operation described above. In fact, it can be shown that by controlling the temperature among phases within a range of $\pm X$ %, a current balance of $\pm X/2$% among phases can be achieved.

While the above is a complete description of the preferred embodiments of the invention, various alternatives, modifications, and equivalents may be used. For example, the feedback control loops of the various phases of the multi-phase power supply embodiments shown in FIGS. 2 and 4 need not exactly comprise the exact sequence and combination of an op-amp, a summer, a shared error amplifier, a PWM and a driver. Indeed, the feedback control loop, as conceived by the inventor, may comprise any circuitry, which operates to feedback a signal for adjusting the duty cycle provided by the PWM, based on the relative temperatures of the phase's package and the temperature control bus. For this and other reasons, therefore, the above description should not be taken as limiting the scope of the invention, which is defined by the appended claims.

What is claimed is:

1. A current sharing multi-phase power supply, comprising:
   a first phase unit, comprising:
      a first package containing a first dc-to-dc converter operable to supply a first portion of a load current to a load coupled to said first converter,
      a first pulse width modulator coupled to the first converter operable to provide a first periodic pulse train to the first converter, said first periodic pulse train having a duty cycle;
   a second phase, comprising:
      a second package containing a second dc-to-dc converter operable to supply a second portion of the load current to the load,
      a second pulse width modulator coupled to the second converter operable to provide a second periodic pulse train to the second converter, said second periodic pulse train having a duty cycle; and
      a temperature control bus coupled to the first and second phase units, said temperature control bus having a bus temperature related to temperatures of the first and second packages,
         wherein the duty cycles of the first and second pulse trains are adjusted in a feedback operation, the extent of said adjustments depending on a relationship among the temperature of the first package, the temperature of the second package and the bus temperature.

2. The multi-phase power supply of claim 1, wherein the first package further comprises a temperature sensor operable to measure the temperature of the first package and the second package further comprises a temperature sensor operable to measure the temperature of the second package.

3. The multi-phase power supply of claim 2, wherein a bus voltage on the temperature control bus represents an average of the measured temperatures of the first and second packages.

4. The multi-phase power supply of claim 3, further comprising:
   a first temperature-to-voltage converter operable to convert the measured temperature of the first package to a voltage representing the temperature of the first package; and
   a second temperature-to-voltage converter operable to convert the measured temperature of the second package to a voltage representing the temperature of the second package.

5. The multi-phase power supply of claim 4, wherein the first temperature-to-voltage converter is contained in the first package and the second temperature-to-voltage converter is contained in the second package.

6. The multi-phase power supply of claim 5, further comprising:
   a first amplifier having an inverting input coupled to an output of the first temperature-to-voltage converter and a non-inverting input coupled to the temperature control bus; and
   a second amplifier having an inverting input coupled to an output of the second temperature-to-voltage converter and a non-inverting input coupled to the temperature control bus.

7. The multi-phase power supply of claim 6, wherein first and second resistors, having substantially the same resistance, are coupled between the inverting and non-inverting inputs of the first and second amplifiers, respectively.

8. The multi-phase power supply of claim 7, further comprising:
   an error amplifier having a non-inverting input coupled to a predetermined reference voltage, an inverting input coupled to the load, and an output.

9. The multi-phase power supply of claim 8, further comprising:
   a first summer configured to add an output signal from an output of the first amplifier to an output signal from the output of the error amplifier and couple the summed signal to an input of the first pulse width modulator; and
   a second summer configured to add an output signal from an output of the second amplifier to the output signal from the output of the error amplifier and couple the summed signal to an input of the second pulse width modulator.

10. The multi-phase power supply of claim 9, further comprising:
    a first driver coupled between the first pulse width modulator and the first converter, said first driver configured to accept the first periodic pulse train from the first pulse width modulator; and
    a second driver coupled between the second pulse width modulator and the second converter, said second driver configured to accept the second periodic pulse train from the second pulse width modulator.

11. The multi-phase power supply of claim 10, where in the first and second drivers are contained in the first and second packages, respectively.

12. The multi-phase power supply of claim 2, wherein a bus voltage on the temperature control bus represents the greater of the measured temperatures of the first and second packages.

13. The multi-phase power supply of claim 12, further comprising:
    a first temperature-to-voltage converter operable to convert the measured temperature of the first package to a voltage representing the temperature of the first package; and
    a second temperature-to-voltage converter operable to convert the measured temperature of the second package to a voltage representing the temperature of the second package.

14. The multi-phase power supply of claim 13, wherein the first temperature-to-voltage converter is contained in the first package and the second temperature-to-voltage converter is contained in the second package.

15. The multi-phase power supply of claim 14, further comprising:
    a first amplifier having an inverting input coupled to an output of the first temperature-to-voltage converter and a non-inverting input coupled to the temperature control bus; and
    a second amplifier having an inverting input coupled to an output of the second temperature-to-voltage converter and a non-inverting input coupled to the temperature control bus.

16. The multi-phase power supply of claim 15, further comprising:
    a first diode having an anode coupled to the inverting input of the first amplifier and a cathode coupled to the non-inverting input of the first amplifier; and
    a second diode having an anode coupled to the inverting input of the second amplifier and a cathode coupled to the non-inverting input of the second amplifier.

17. The multi-phase power supply of claim 16, further comprising:
    an error amplifier having a non-inverting input coupled to a predetermined reference voltage, an inverting input coupled to the load, and an output.

18. The multi-phase power supply of claim 17, further comprising:
    a first summer configured to add an output signal from an output of the first amplifier to an output signal from the output of the error amplifier and couple the summed signal to an input of the first pulse width modulator; and
    a second summer configured to add an output signal from an output of the second amplifier to the output signal from the output of the error amplifier and couple the summed signal to an input of the second pulse width modulator.

19. The multi-phase power supply of claim 18, further comprising:
    a first driver coupled between the first pulse width modulator and the first converter, said first driver configured to accept the first periodic pulse train from the first pulse width modulator; and
    a second driver coupled between the second pulse width modulator and the second converter, said second driver configured to accept the second periodic pulse train from the second pulse width modulator.

20. The multi-phase power supply of claim 19, wherein the first and second drivers are contained in the first and second packages, respectively.

21. A method of promoting current sharing among phases of a multi-phase power supply, the method comprising the steps of:
    for each phase, measuring a temperature of a package containing a dc-to-dc converter; and
    for each phase, employing a feedback control means, disposed between an output of the supply and a control input of the converter, to control and reduce the temperature variation and current variation among packages.

22. The method of claim 21, wherein the feedback control means compares each of the measured package temperatures to an average of the measured package temperatures to control and reduce the temperature variation and current variation among packages.

23. The method of claim 21, wherein the feedback control means compares each of the measured package temperatures to the highest of the measured package temperatures to control and reduce the temperature variation and current variation among packages.

24. A multi-phase power supply having a plurality of phase blocks, each phase block comprising:

a package containing a dc-to-dc converter, a temperature sensor and a temperature-to-voltage converter; and a pulse width modulator disposed within a feedback loop and coupled between an output of the temperature-to-voltage converter and an input of the converter.

25. The multi-phase power supply of claim 24, wherein each phase block further comprises:

an amplifier having a first input coupled to the output of the temperature-to-voltage converter, a second input coupled to a temperature control bus share bus; and a summer having a first input coupled to an output of the amplifier and an output coupled to the pulse width modulator.

26. The multi-phase power supply of claim 24, further comprising an error amplifier having a first input coupled to a reference voltage, a second input coupled to an output of the supply and an output coupled to a second input of each summer within each phase block.

27. The multi-phase amplifier of claim 25, wherein the amplifier within each phase block has a resistor coupled across its inputs.

28. The multi-phase amplifier of claim 25, wherein the amplifier within each phase block has a diode coupled across its inputs.

29. The multi-phase amplifier of claim 24, wherein each phase block further comprises a driver coupled between the pulse width modulator and the input of the converter.

30. The multi-phase amplifier of claim 29, wherein the driver of each phase is contained within its associated package.

* * * * *

UNITED STATES PATENT AND TRADEMARK OFFICE
CERTIFICATE OF CORRECTION

PATENT NO.      : 6,449,174 B1
DATED           : September 10, 2003
INVENTOR(S)     : Elbanhawy It is certified that error appears in the above-identified patent and that said Letters Patent is hereby corrected as shown below:

<u>Title page,</u>
In the figure "210-1" should read -- 210-N --. (See Fig. 2)

<u>Drawings,</u>
In Fig. 1, a dot should be inserted at the point above element 106 parallel to the point of appearance of the dot below element 106.
In Fig. 2, "210-1" should read -- 210-N --.
In Fig. 3, a dot should be inserted at the point above element 306 parallel to the point of appearance of the dot below element 306.
In Fig. 4, "410-1" should read -- 410-N -- and element "414" of the temperature control bus should read -- 412 --.

Signed and Sealed this

Twenty-fourth Day of June, 2003

JAMES E. ROGAN
*Director of the United States Patent and Trademark Office*